United States Patent
Johnston

(10) Patent No.: US 7,646,863 B2
(45) Date of Patent: Jan. 12, 2010

(54) MOVEMENT POWERED HEADSET

(75) Inventor: Timothy P. Johnston, Los Gatos, CA (US)

(73) Assignee: Plantronics, Inc., Santa Cruz, CA (US)

( * ) Notice: Subject to any disclaimer, the term of this patent is extended or adjusted under 35 U.S.C. 154(b) by 409 days.

(21) Appl. No.: 11/604,376

(22) Filed: Nov. 22, 2006

(65) Prior Publication Data

US 2008/0116849 A1 May 22, 2008

(51) Int. Cl.
*H04M 1/00* (2006.01)
*H04M 9/00* (2006.01)
(52) U.S. Cl. .................... 379/430; 379/428.02
(58) Field of Classification Search ........... 379/428, 379/430, 428.01, 428.02; 455/572, 573; 381/370, 384
See application file for complete search history.

(56) References Cited

U.S. PATENT DOCUMENTS 6,992,415 B2    1/2006   Cibie

2004/0137961 A1   7/2004   Tu et al.
2006/0166716 A1   7/2006   Seshadri et al.

FOREIGN PATENT DOCUMENTS

GB   2389719 A1   12/2003
WO   2004/093413 A2   10/2004

OTHER PUBLICATIONS

International Search Report mailed on Jun. 23, 2008 in PCT/US2007/023557.
Written Opinion of the International Searching Authority mailed on Jun. 23, 2008 in PCT/US2007/023557.

*Primary Examiner*—Tuan D Nguyen
(74) *Attorney, Agent, or Firm*—Haynes Boone, LLP; David Park

(57) ABSTRACT

An apparatus and method are provided for advantageously powering a headset without a power cable. In one example, a headset includes a processor, an acoustic transducer, and a kinetic energy converter operably coupled to a power cell for powering the headset, the kinetic energy converter capable of converting kinetic energy of the headset into an output charge for charging the power cell. Advantageously, the present disclosure provides for reliably and efficiently powering a headset without having to replace or dock a headset battery and without requiring power cables.

17 Claims, 4 Drawing Sheets

MOVEMENT POWERED HEADSET

TECHNICAL FIELD

The present invention relates generally to headset devices and, more particularly, to an apparatus and method for providing power to a headset.

BACKGROUND

Telephone headsets are used in various environments, such as call centers, offices, gyms, and cars, and wireless headsets are gaining in popularity as they allow for greater freedom of movement and flexibility.

Wireless headsets require that the power supply, typically a battery, be recharged or replaced periodically, sometimes on a daily occurrence. To recharge the headset, the user requires a power supply, common examples of which are a wall transformer in a home or business and a cigarette lighter adapter in an automobile.

Such previous means and methods for powering a headset have led to inefficiencies and downtime for use of the headset. In many consumer environments, plugging in and unplugging a headset, constantly replacing a battery, or docking a headset to recharge a battery, may be inconvenient, easily forgotten, and/or inefficient. Thus, a reliable means and method for powering a wireless headset is highly desirable.

SUMMARY

The present invention provides an advantageous apparatus and method for powering a headset without having to replace or dock a headset battery and without requiring power cables.

In one embodiment of the present invention, a headset is provided, the headset comprising a processor, an acoustic transducer, and a kinetic energy converter operably coupled to a power cell for powering the headset, the kinetic energy converter capable of converting kinetic energy of the headset into an output charge for charging the power cell.

In accordance with another embodiment of the present invention, another headset is provided, the headset comprising a processor, an acoustic transducer, and a kinetic energy converter operably coupled to a power cell for powering the headset, the kinetic energy converter including a conductor and an element movable relative to the conductor for converting kinetic energy of the headset into an output charge for charging the power cell.

In accordance with yet another embodiment of the present invention, a method of powering a wireless headset state is provided, the method comprising providing a headset including a processor, an acoustic transducer, and a kinetic energy converter operably coupled to a power cell for powering the headset, detecting kinetic energy of the headset, converting the detected kinetic energy into an output charge, and charging the power cell with the output charge to power a headset function.

Advantageously, the present invention allows for the efficient powering of headsets in various environments, and in particular, allows an active headset user to use a wireless headset substantially non-stop without having to replace or dock the headset battery.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

The present invention provides an advantageous apparatus and method for powering a headset. In accordance with the present invention, the motion of a headset drives micro-movements of a movable element, such as a rotor, flywheel, and/or magnet, with respect to a conductor such as a coiled wire or trace array, to induce an electromotive force (EMF), or voltage. This voltage is used to charge a power cell that stores and supplies power to the headset's radio, essentially powering the headset. The headset further includes a built-in recharging system, in one example, that is powered by headset movement. The present invention thus allows a headset to operate and recharge without requiring power cables.

The human head moves a large amount during normal daily activities, such as subtle nods, turns, shaking, etc., as well as when the whole body is experiencing movement such as walking, running, climbing stairs, riding in a vehicle, riding a horse, riding a bicycle, scooter, skateboard, skiing, climbing a mountain, and virtually any physical activity. Additionally, movement and vibration of the headset when not being worn, such as when stowed in the user's pocket, briefcase, purse, or a vehicle, would also contribute to the headset's charging ability.

Figure 1:
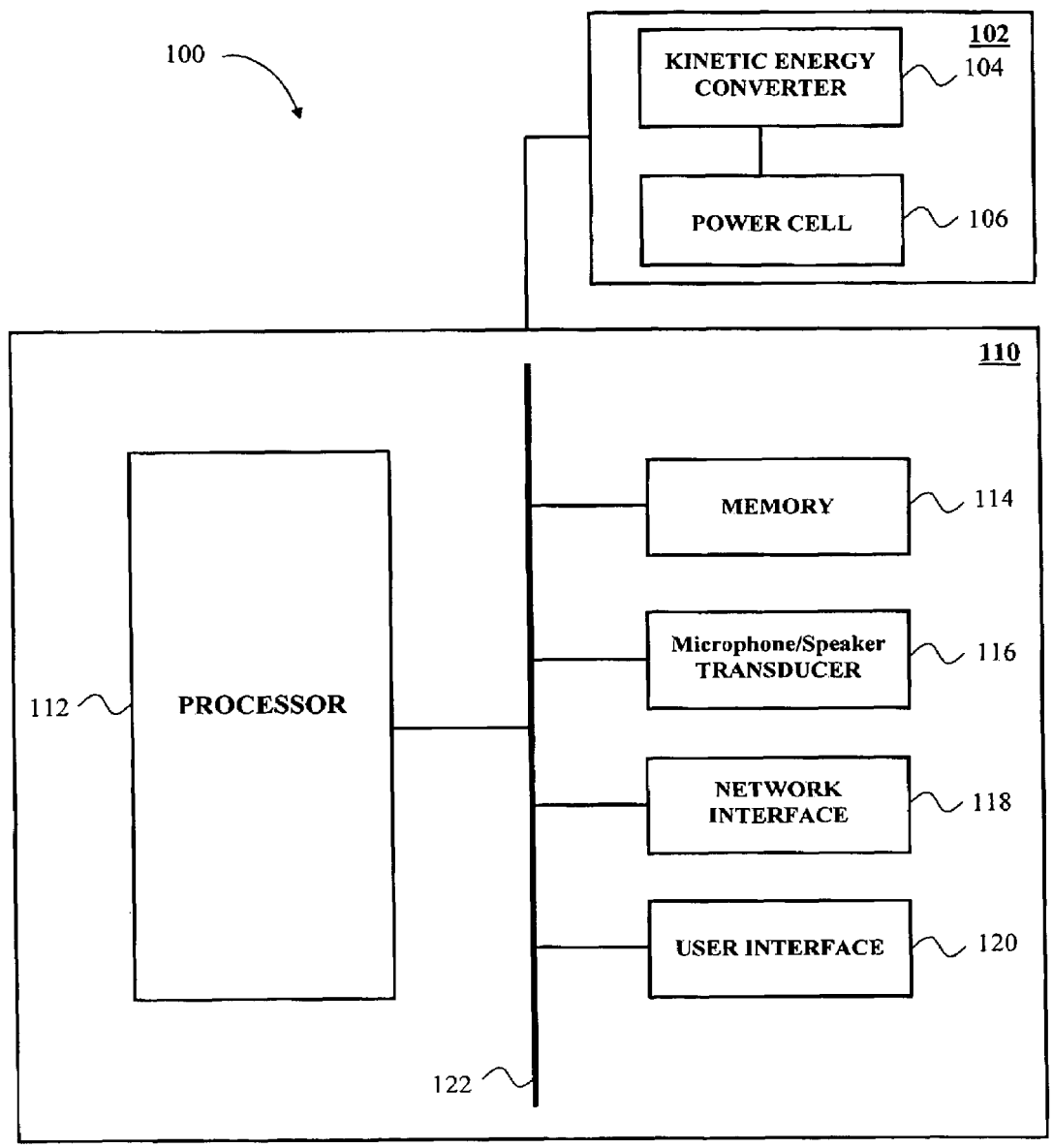
FIG. 1 shows a block diagram of a headset including a kinetic energy converter and a power cell in accordance with an embodiment of the present invention.

Referring now to FIG. 1, a block diagram of a headset 100 is illustrated in accordance with an embodiment of the present invention. Headset 100 includes a kinetic energy converter 104 operably coupled to a power cell 106 in a headset power supply portion 102. Headset 100 further includes a processor 112 operably coupled via a bus 122 to a memory 114, a transducer 116, an optional network interface 118, and an optional user interface 120 in a headset portion 110.

It is noted that headset 100 may be wired or wireless. In one example, headset 100 may be wired to an adaptor which is coupled to a network, or headset 100 may be wirelessly coupled to an access point (AP) (not shown), which is operably coupled with a network. In one example, the network may be a communications network which may include a public switched telephone network (PSTN), an integrated services digital network (ISDN), a local area network (LAN), and/or a wireless local area network (WLAN), that support standards such as Ethernet, wireless fidelity (WiFi), and/or voice over internet protocol (VoIP).

In one example, an AP includes a transceiver and a processor configured to allow a wireless device (e.g., a headset) access to a network connected to the access point (e.g., via a 10/100 Ethernet RJ-45 port). An AP may be any device that allows wireless-equipped computers and other devices to communicate with a wired network. In one example, an AP is able to support WiFi in general, and the 802.11a, 802.11b, and/or 802.11g wireless networking standards in particular. In other examples, the AP may be able to support other wireless networking standards.

Kinetic energy converter (KEC) 104 includes a rotor and a generator providing output charges to charge power cell 106 in one example. As the user wears the headset, subtle movements of the head (e.g., from standing, sitting, walking, or running) cause movement of the headset, thereby moving an internal rotor due to acceleration, gravity, or both. In one example, the rotor rotates back and forth in a circular motion at the slightest movement of the head, body, car, or combination thereof. KEC 104 converts kinetic energy from head and/or body movement into an electromotive force, or an output charge. In other words, motion of the headset induces a small fluctuating current flow in a nearby electrical conductor. Current in this conductor is collected by power cell 106, for example a rechargeable battery. Embodiments of KEC 104 will be described in more detail below in conjunction with FIGS. 2-4.

Processor 112 allows for processing data, in one example including the power level of power cell 106. Processor 112 may also process information about access points, service providers, and service accounts in one embodiment for wireless headsets. In one example, processor 112 is a high performance, highly integrated, and highly flexible system-on-chip (SOC), including signal processing functionality such as echo cancellation/reduction and gain control in another example. Processor 202 may include a variety of processors (e.g., digital signal processors), with conventional CPUs being applicable.

Memory 114 may include a variety of memories, and in one example includes SDRM, ROM, flash memory, or a combination thereof. Memory 114 may further include separate memory structures or a single integrated memory structure. In one example, memory 114 may be used to store passwords, network and telecommunications programs, and/or an operating system (OS).

Transducer 116 may include an acoustic transducer, such as a microphone, a speaker, or a combination thereof, for transmission of sound (such as from the user's mouth or to the user's ear based upon signals from an audio source). Transducer 208 may also include a plurality of separate transducers for performing different functions. The transducer can be any type of electromagnetic, piezoelectric, or electrostatic type of driving element, or a combination thereof, or another form of driving element, for generating sound waves from the output face of the transducer. In one embodiment, the transducer may receive signals through wireless communication channels, such as by Bluetooth™ protocols and hardware, in one example.

Network interface 118 allows for communications with APs, and in one example includes a transceiver for communicating with a wireless local area network (LAN) radio transceiver (e.g., wireless fidelity (WiFi), Bluetooth, ultra wideband (UWB) radio, etc.) for access to a network (e.g., a wireless LAN or the Internet), or an adaptor for providing wired communications to a network. In one example, network interface 118 is adapted to derive a network address for the headset using the headset's electronic serial number, which is used to identify the headset on the network. In one embodiment, the electronic serial number may be the headset's Media Access Control (MAC) address; however, the electronic serial number may be any number that is mappable to a network address. Network interface 118 is adapted to communicate over the network using the network address that it derives for the headset. In one embodiment, network interface 118 is able to transmit and receive digital and/or analog signals, and in one example communicates over the network using IP, wherein the network interface uses the headset's MAC address or another globally unique address as its IP address. In particular, network interface 118 may be operably coupled to a network via the IEEE 802.11 protocol. However, the network interface 210 may communicate using any of various protocols known in the art for wireless or wired connectivity.

An example of an applicable network interface and the Internet protocol layers (and other protocols) of interest for the present invention are described in pending U.S. patent application Ser. No. 10/091,905 filed Mar. 4, 2002, the full disclosure of which is hereby incorporated by reference for all purposes.

User interface 120 allows for manual communication between the headset user and the headset, and in one example includes an audio and/or visual interface such that a prompt may be provided to the user's ear and/or an LED may be lit when power of power cell 106 is low or a visual graphic may be provided to indicate the power level.

Figure 2:
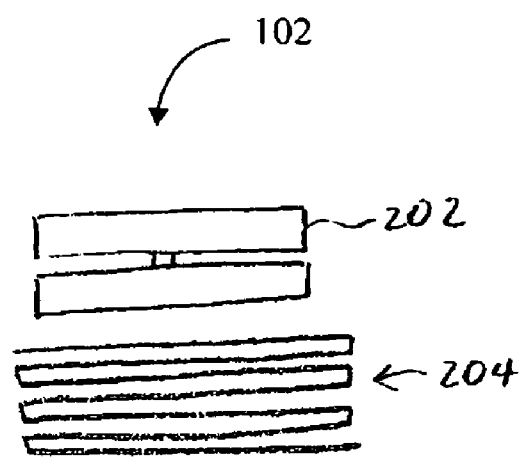
FIGS. 2 through 4B show different embodiments of a kinetic energy converter used in a headset in accordance with an embodiment of the present invention.
Figure 3:
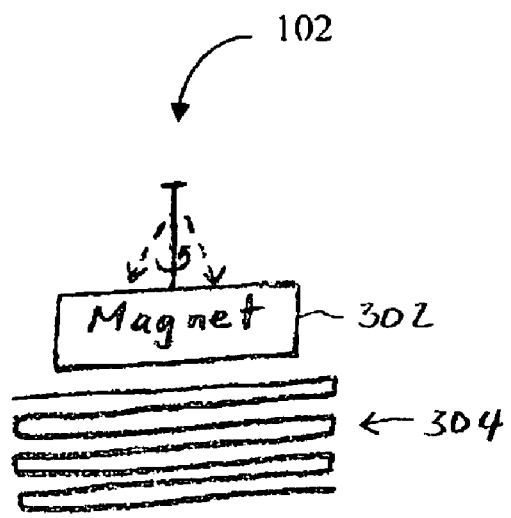

Referring now to FIGS. 2 through 4, different embodiments of kinetic energy converter 104 are described in accordance with the present invention.

FIG. 2 illustrates a flywheel 202 that moves relative to a trace array 204 to generate an output charge in trace array 204 for eventual storage in power cell 106 (FIG. 1). A rotor winds a mainspring, for example a flat coiled spring, that powers flywheel 202 to move with respect to the trace array 204. The rotor may be wound by headset movement or by hand if the headset is left unanimated too long. The rotor turning the mainspring is governed by a ratchet system that keeps the spring from unwinding, essentially allowing the energy from the rotor to be stored in the spring. The spring then drives the generator at a constant speed with flywheel 202 to reduce fluctuation in drive speed. Flywheel 202 includes a rotating magnet to be driven near trace array 204 at a consistent rate, thereby inducing current in the traces. The electrical trace array patterns may be on a printed circuit board. The leads from the trace array may be arranged so that there are two circuits, allowing capture of current through the entire rotation of the flywheel. The current is then rectified with diodes and the dc current is supplied to power cell 106, including a capacitor in one example, through wire leads.

FIG. 3 illustrates a suspended magnet 302 that moves relative to a trace array 304 to generate an output charge in trace array 304 for eventual storage in power cell 106 (FIG. 1). Gravity and/or inertia causes magnet 302 to move with respect to the trace array 304 whenever the headset wearer moves the headset or the headset is moved. The electrical trace array patterns may be on a printed circuit board. In one example, magnet 302 may be configured to pivot over-center, thereby requiring a more significant movement before the weight of the magnet falls into the "other" position. The current is then rectified with diodes and the dc current is supplied to power cell 106, including a capacitor in one example, through wire leads.

Figure 4A:
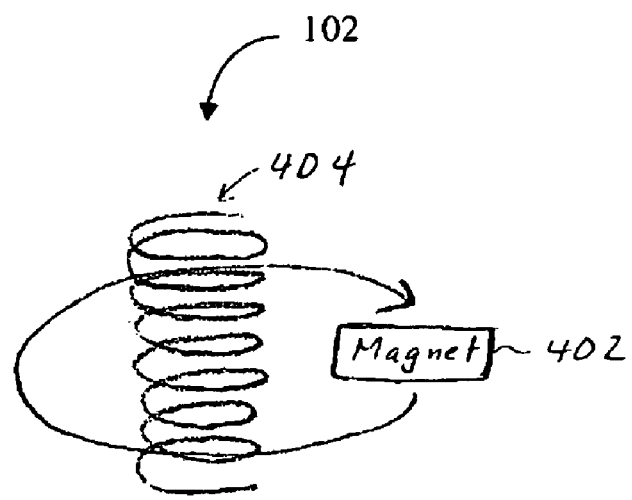
Figure 4B:
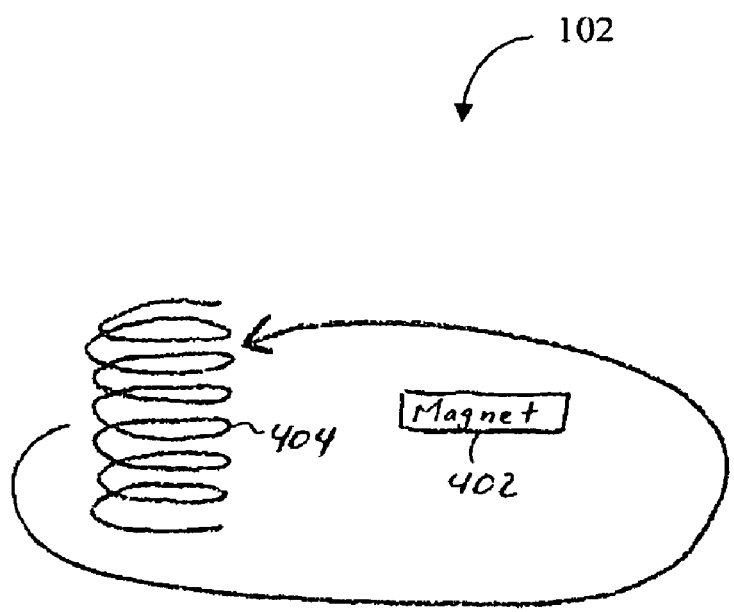

FIGS. 4A and 4B illustrate a magnet 402 and a conductor 404, such as a coil, that move relative to one another such that an output charge is generated in accordance with an embodiment of the present invention. FIG. 4A illustrates a movable magnet 402 that moves relative to a fixed conductor 404, and FIG. 4B illustrates a movable conductor 404 that moves relative to a fixed magnet 402. The movable component may be hinged, suspended, or otherwise mechanically coupled so that gravity or inertia drives slight movement with respect to the headset whenever the headset wearer moves his head or body or the headset is otherwise moved. In one example, the fixed magnet may be the same magnet used in a moving-coil transducer contained in the headset. The current from conductor 404 is then rectified with diodes and the dc current is supplied to power cell 106, including a capacitor in one example, through wire leads.

In critical applications, two or more of the embodiments described above may be used in one headset in order to power the headset. Furthermore, the present invention may be used in conjunction with a typical rechargeable battery.

Other embodiments of a kinetic energy converter in which the motion of a headset drives micro-movements of a movable element with respect to a conductor to induce an electromotive force (EMF) or voltage may be found in U.S. application Ser. No. 11/542,385 ("Donned and Doffed Headset State Detection"), filed Oct. 2, 2006, the contents of which are incorporated by reference herein for all purposes.

Figure 5:
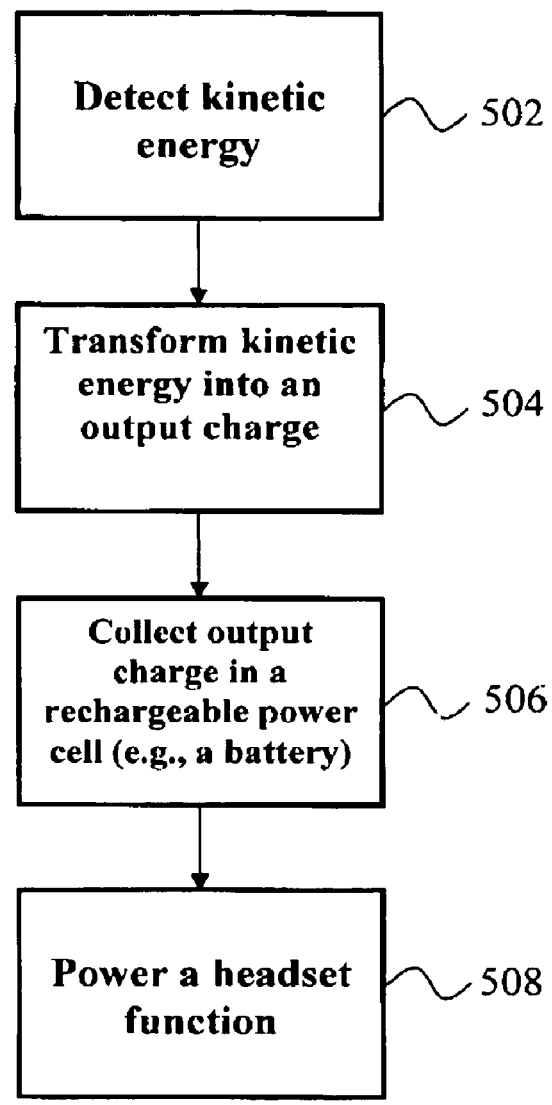
FIG. 5 is a flowchart showing a method of powering a headset in accordance with an embodiment of the present invention.

Referring now to FIG. 5 in conjunction with FIG. 1, a flowchart of a method for powering a headset is illustrated in accordance with an embodiment of the present invention. At step 502, kinetic energy of the headset is detected by kinetic energy converter 104. At step 504, KEC 104 converts the kinetic energy to provide an output charge. At step 506, a plurality of output charges are collected by power cell 106. At step 508, the power cell is used to power a headset function.

Advantageously, the present invention provides a headset and method for reliably and efficiently powering a headset in various environments, and in particular, allows an active headset user (e.g., in military or exercise environments) to use the headset substantially non-stop without having to replace or dock the headset battery and without requiring power cables.

Embodiments described above illustrate but do not limit the invention. It should also be understood that numerous modifications and variations are possible in accordance with the principles of the present invention. Although headsets are described above, the present invention may be used in a variety of head-worn devices, such as a head-mounted computer display. Accordingly, the scope of the invention is defined only by the following claims.

What is claimed is:

1. A headset, comprising:
a processor;
an acoustic transducer; and
a kinetic energy converter operably coupled to a power cell for powering the headset, the kinetic energy converter including a conductor trace array and an element that moves relative to the conductor trace array based upon head movement to convert kinetic energy of the headset into an output charge for charging the power cell.

2. The headset of claim 1, further comprising a conductor coil and another element that moves relative to the conductor coil based upon head movement.

3. The headset of claim 1, wherein the element is selected from the group consisting of a rotor, a coil, a magnet, and a flywheel.

4. The headset of claim 3, wherein the element is configured to rotate or pivot.

5. The headset of claim 1, wherein the power cell is operably coupled to a circuit for performing a headset function.

6. The headset of claim 1, further comprising a rechargeable battery operably coupled to the power cell.

7. The headset of claim 1, wherein the element includes a suspended magnet.

8. The headset of claim 1, wherein the element includes a rotor, a spring, and a flywheel.

9. A method of powering a wireless headset, the method comprising:
providing a headset including a processor, an acoustic transducer, and a kinetic energy converter operably coupled to a power cell for powering the headset;
moving an element of the kinetic energy converter relative to a conductor trace array of the kinetic energy converter based upon head movement to convert kinetic energy of the headset into an output charge; and
charging the power cell with the output charge to power a headset function.

10. The method of claim 9, wherein the kinetic energy converter includes a magnet and a coil moving relative to one another.

11. The method of claim 9, wherein the kinetic energy converter includes one selected from the group consisting of a coil moving relative to a fixed magnet, and a magnet moving relative to a fixed coil.

12. The method of claim 9, wherein the kinetic energy converter includes a flywheel moving relative to trace array.

13. The method of claim 9, wherein the kinetic energy converter includes a suspended magnet moving relative to the trace array.

14. The method of claim 9, further comprising powering the headset with a rechargeable battery operably coupled to the power cell.

15. A headset, comprising:
a processor;
an acoustic transducer; and
a kinetic energy converter operably coupled to a power cell for powering the headset, the kinetic energy converter including a piezoelectric crystal and a mass element that moves based upon head movement to exert a force on the piezoelectric crystal to convert kinetic energy of the headset into an output charge for charging the power cell.

16. The headset of claim 15, wherein the power cell is operably coupled to a circuit for performing a headset function.

17. The headset of claim 15, further comprising a rechargeable battery operably coupled to the power cell.

* * * * *

UNITED STATES PATENT AND TRADEMARK OFFICE
CERTIFICATE OF CORRECTION

| | | |
|---|---|---|
| PATENT NO. | : 7,646,863 B2 | Page 1 of 1 |
| APPLICATION NO. | : 11/604376 | |
| DATED | : January 12, 2010 | |
| INVENTOR(S) | : Timothy P. Johnston | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 460 days.

Signed and Sealed this

Sixteenth Day of November, 2010

David J. Kappos
*Director of the United States Patent and Trademark Office*